United States Patent
Hsu et al.

(10) Patent No.: US 9,164,746 B2
(45) Date of Patent: Oct. 20, 2015

(54) AUTOMATIC TOPOLOGY EXTRACTION AND PLOTTING WITH CORRELATION TO REAL TIME ANALYTIC DATA

(71) Applicants: Jack P. Hsu, Mountain View, CA (US); Tim G. Kimmet, Los Gatos, CA (US)

(72) Inventors: Jack P. Hsu, Mountain View, CA (US); Tim G. Kimmet, Los Gatos, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 29 days.

(21) Appl. No.: 13/665,798

(22) Filed: Oct. 31, 2012

(65) Prior Publication Data

US 2014/0123126 A1 May 1, 2014

(51) Int. Cl.
G06F 9/445 (2006.01)
G06F 9/44 (2006.01)

(52) U.S. Cl.
CPC ........................................ *G06F 8/61* (2013.01)

(58) Field of Classification Search
None
See application file for complete search history.

(56) References Cited

U.S. PATENT DOCUMENTS

| | | | |
|---|---|---|---|
| 6,014,697 A | 1/2000 | Lewis | |
| 6,202,207 B1 | 3/2001 | Donohue | |
| 6,239,800 B1 * | 5/2001 | Mayhew et al. | 715/764 |
| 6,425,126 B1 | 7/2002 | Branson | |
| 6,980,211 B2 | 12/2005 | Lin | |
| 7,035,930 B2 | 4/2006 | Graupner | |
| 7,075,536 B1 | 7/2006 | Goldschmidt | |
| 7,665,085 B2 | 2/2010 | Sundararajan | |
| 7,925,491 B2 | 4/2011 | Sasatani | |
| 8,464,222 B2 * | 6/2013 | Bell et al. | 717/126 |
| 8,478,699 B1 | 7/2013 | Alfonseca | |
| 8,543,681 B2 | 9/2013 | Bearden | |
| 8,589,915 B2 | 11/2013 | Wookey | |
| 2002/0161879 A1 | 10/2002 | Richard | |
| 2003/0079188 A1 | 4/2003 | Ivanov | |
| 2006/0080417 A1 | 4/2006 | Boutboul | |
| 2009/0276269 A1 | 11/2009 | Yee | |
| 2010/0031248 A1 * | 2/2010 | Sonkin et al. | 717/174 |
| 2010/0223609 A1 * | 9/2010 | DeHaan et al. | 717/177 |
| 2010/0281456 A1 * | 11/2010 | Eizenman et al. | 717/104 |
| 2011/0088011 A1 * | 4/2011 | Ouali | 717/105 |
| 2012/0151469 A1 * | 6/2012 | Wookey | 717/175 |
| 2012/0271937 A1 | 10/2012 | Cotten | |
| 2013/0138783 A1 * | 5/2013 | Mallur et al. | 709/221 |
| 2013/0198734 A1 * | 8/2013 | Biswas et al. | 717/174 |
| 2013/0283252 A1 * | 10/2013 | Mannarswamy et al. | 717/168 |
| 2013/0332900 A1 * | 12/2013 | Berg et al. | 717/121 |

FOREIGN PATENT DOCUMENTS

EP 2141832 B1 9/2013

* cited by examiner

*Primary Examiner* — Lewis A Bullock, Jr.
*Assistant Examiner* — Jacob Dascomb
(74) *Attorney, Agent, or Firm* — Bryan Cave LLP

(57) ABSTRACT

Systems and methods are disclosed for extracting a topology for an installation of a plurality of software components. The topology may be extracted from instantiating instructions for the components of the installation such as an application manifest, manifest tree, configuration scripts, source code, and the like. One of a plurality of rendering engines generates one of a plurality of representations of the topology. Status data for the components may be collected and visually represented on the graphical representation of the topology. Examples of representations include a network topology, a release pipeline graph, a service architecture, and a state machine graph. The status of the topology may be updated in realtime as status information is output by the installation.

19 Claims, 8 Drawing Sheets

# AUTOMATIC TOPOLOGY EXTRACTION AND PLOTTING WITH CORRELATION TO REAL TIME ANALYTIC DATA

BACKGROUND

1. Field of the Invention

This invention relates to systems and methods for managing an application installation and associated resources.

2. Background of the Invention

Today's applications are very complex both in terms of actual functionality and in the number of components that must interact in order to provide a computing service. Often times the same vendor may provide multiple independent software components to define a complete workflow path that is desired by a customer. Many applications often require various external resources to facilitate their operation. Often, these resources are standardized software modules or systems such as databases, web servers, and the like. The deployment of applications has also recently been facilitated by using commoditized services such as a "Platform as a Service" (PaaS) that provides the capability to provision the different artifacts of a computing platform on demand, such as an operating system, database, web server, file system, storage and network resources, where applications can be deployed. Typically the PaaS also interacts with an IaaS component to provision the virtual machines (or compute power) before the software can be deployed.

The following detailed description provides scalable and improved systems and methods for visualizing and monitoring a complex installation with multiple interdependent software components.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1B:
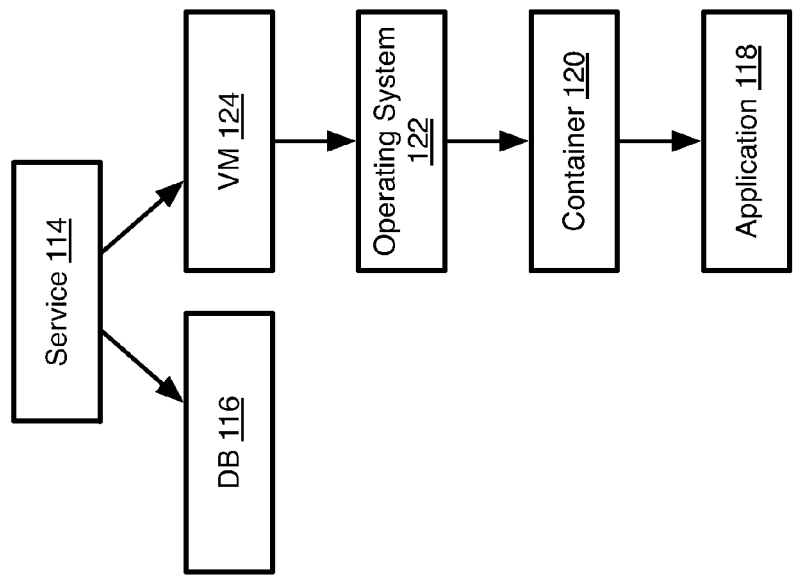
FIG. 1B is a schematic block diagram of an installation in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1A:
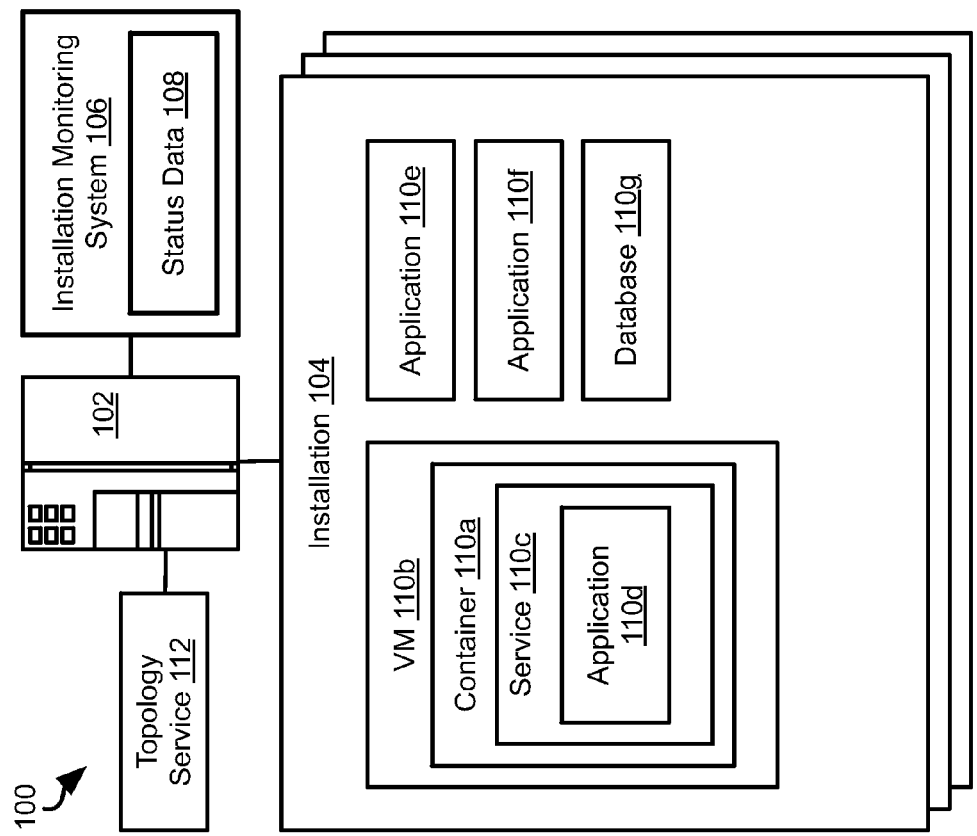
FIG. 1A is a schematic block diagram of a system for providing a topology service in accordance with an embodiment of the present invention.

FIG. 1A illustrates components of a system 100 suitable for implementing methods described herein. The system 100 may include a server system 102. The server system 102 may be embodied as one or more computing devices that are in data communication with one another. One or more computing devices of the server system 102 may host an installation 104 including independently executable software components that interact with one another to provide a service. In particular, the methods disclosed herein are particularly useful for use with platform as a service (PaaS) installation 104.

One or more computing devices of the server system 102 may host an installation monitoring system 106 that one or both of collects status data 108 for components of the installation 104 and generated reports based on the status data 108. In some embodiments, each component may monitor and report its own status data. In such embodiments, the installation monitoring system 106 may be omitted or interface with the components of the installation 104 to collect the status data output by the components.

The installation 104 may include any collection of independently installable and executable software components. In particular, software components that communicate with one another or define a workflow path may benefit from use of the systems and methods disclosed herein. As an example, the installation 104 may include a container 110a that may operate within a virtual machine (VM) 110b. In a like manner the container 110a may provide a platform for execution of a service 110c, such as a web service. The service 110c may have executing therein an application 110d. The installation 104 may include one or more applications 110e-110f that likewise provide a service to one or more users or other computer systems. The installation 104 may also include one or more databases 110g, including interfaces for storing data in the database and retrieving data therefrom.

One or more of the computing devices of the server system 102 may host a topology service 112. The topology service 112 may be independent of the installation 104. The topology service 112 is operable to extract topology data for the installation 104 and graphically represent the topology data. The topology service 112 is likewise operable to correlate status data 108 to the topology data in order to provide real-time graphical representations of the installation 104.

Referring to FIG. 1B, in some embodiments, the installation 104 may be defined according to an application manifest. The definition and use of an application manifest may be in accordance with the systems and methods described U.S. patent application Ser. Nos. 13/631,177; 13/631,203; 13/631,323 (hereinafter "the Manifest Applications"), filed Sep. 28, 2012, which are hereby incorporated herein by reference in their entirety for all purposes. As described in the Manifest Applications, an application manifest may describe resources that may be automatically instantiated and configured for use by an application associated with an application manifest. In a like manner, each of these resources may have an associated manifest that is consumed in order to provision any sub-resources of the resource. In this manner, an application manifest tree is created wherein each node of the tree is resource or the top application and the descendants of each node are the resources provisioned for the node.

For example, as shown in FIG. 1B, a service 114 may have a database 116 provisioned therefore. The service 114 may also have provisioned therefor an application 118. In order for the application to operate, a container 120 may be provisioned, which in turn requires an operating system 122. A virtual machine 124 may be provisioned in which for the operating system 122 to execute. Any type of dependencies and provisioning of resources or provisioning for resources may be performed in accordance with an application manifest.

Figure 2:
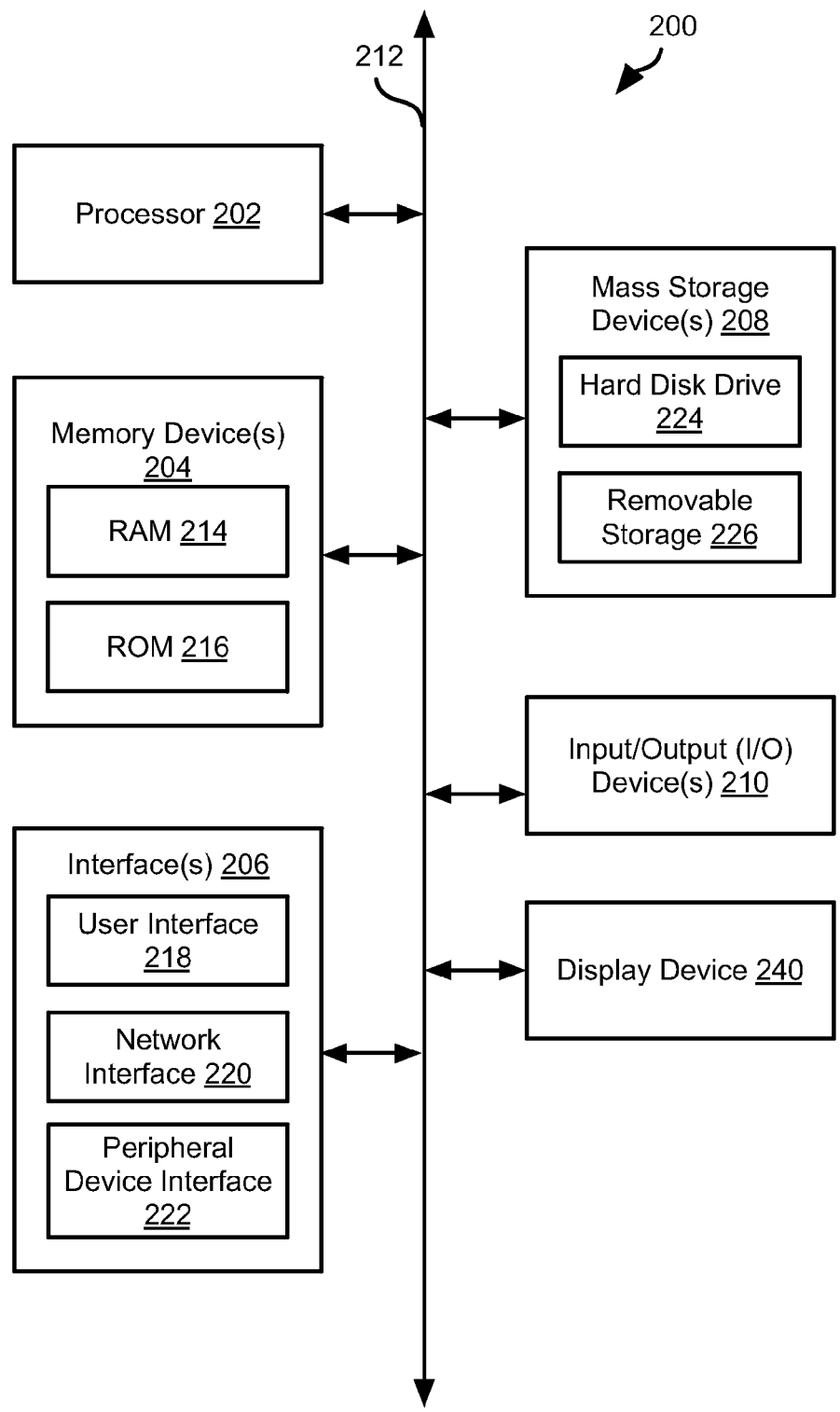
FIG. 2 is a block diagram of a computing device suitable for implementing embodiments of the present invention.

FIG. 2 is a block diagram illustrating an example computing device 200. Computing device 200 may be used to perform various procedures, such as those discussed herein. The computing devices of the server system 102 may include some or all of the components of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, touch screen, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
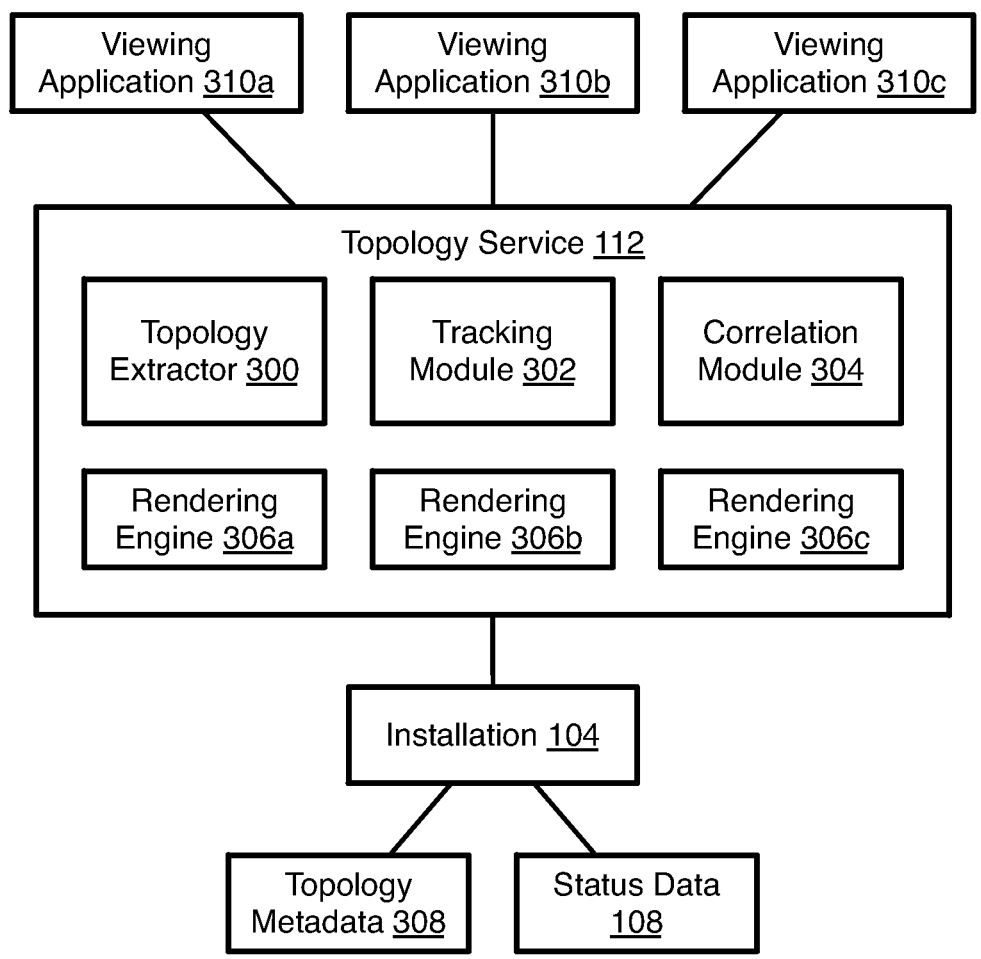
FIG. 3 is a schematic block diagram of a components for providing a topology service in accordance with an embodiment of the present invention.

Referring to FIG. 3, the topology service 112 may include a topology extractor 300, a tracking module 302, and a correlation module 304. The topology service 112 may additionally include one or more rendering engines 306a-306c for generating different types of graphical representations of a topology and the status of a topology.

The topology extractor 300 may be operable to determine the topology of an installation 104. This may include analyzing topology metadata 308 for the installation. For example, topology metadata 308 may include an application manifest as described in the Manifest Applications. Topology metadata 308 may include source code for software components of the installation 104, configuration files for software components, installation logs for software components, and the like. Topology metadata 308 may include such information as entities instantiated as part of the installation 104, the entity that issued instructions to instantiate an entity or on behalf of which an the entity was instantiated, input sources for an entity, output targets for an entity, interfaces exposed by entities, and the like.

The tracking module 302 may retrieve status data for entities of a topology. For example, the tracking module 302 may periodically retrieve status data 108 for an installation 104 or components of an installation 104. Alternatively or additionally the tracking module 302 may subscribe to or otherwise receive output streams (eg., stderr, stdout) of components and extract the status of the component from this output. In instances where status data is retrieved from an aggregator of status data or central repository of status data, the status data may be correlated to a particular component of the installation 104.

A topology and status of an installation 104 may be represented in various forms. In some embodiments, rendering engines 306a-306c may be operable to receive as inputs the topology extracted by the extractor 300 and status data from the tracking module 302 and generate a graphical representation of one or both of the topology and the status data. Various examples of representations of a topology and status data are described in greater detail below.

The output of the rendering engines 306a-306c may be provided to one or more viewing applications 310a-310c. For example, viewing applications may include a web browser, a web browser of a mobile phone or tablet computer, a network operation center (NOC) dashboard, a sharepoint document, or any other application or output device capable of visually displaying graphical data. The output of the rendering engines 306a-306c may be files that can be subsequently accessed by a viewing application, such as a portable document format (PDF) document, or the like.

Figure 4:
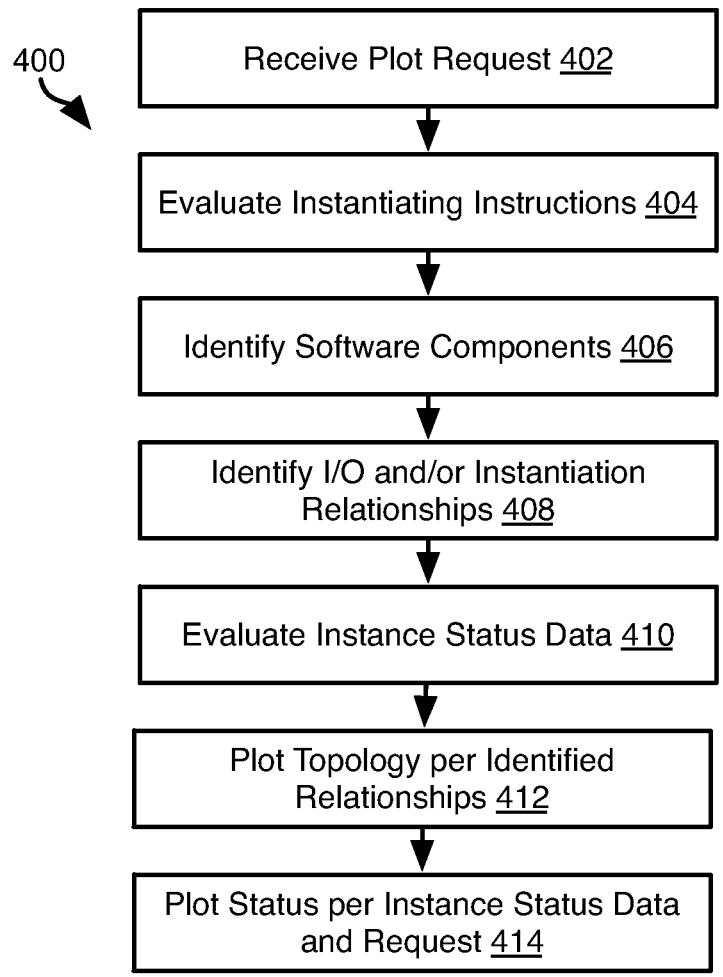
FIG. 4 is a process flow diagram of a method for providing a topology service in accordance with an embodiment of the present invention.

FIG. 4 illustrates an example method 400 that may be implemented using the system 100. In particular, the method 400 may be implemented using a topology service 112. The method 400 may include receiving 402 a request for a plot of one or both of the topology of the installation 104 and the status of the components of the installation 104. The request may indicate a type of graph that is needed. For example, the request may indicate a request for any of the types of representations of an installation status described below. The request may be received 402 from a viewing application and may be automatically generated, such as an automatic refresh request from a web browser or other application to show the current state of the installation 104. In some embodiments, the remaining steps of the method 400 are performed automatically independent of any request to display a graph and the result pushed to a particular target location or device. Accordingly, the step of receiving 402 a plot request may be omitted in such embodiments.

The method 400 may further include evaluating 404 instantiating instructions for the installation 104. Examples of instantiating instructions may include an application manifest or application manifest tree as described above. Instantiating instructions may also include source code, installation scripts, configuration scripts, and the like. In some embodiments, a metadata file for the installation 104 may be user generated for use in plotting the topology of the installation and explicitly describing software components and relationships between the components.

For the instantiating instructions evaluated 404, the method 400 may include identifying 406 software components. Software components may be identified by identifying files of a certain type (e.g. .exe files), identifying instructions to create instances or launch applications or modules of applications, identifying startup instructions for applications or modules of applications in a startup script, identifying the instantiation of applications or modules of applications in source code, and the like.

The method 400 may further include identifying 408 relationships between the identified 406 software components. Examples of relationships include instantiating relationships wherein one software component invokes instantiation of another software component, dependency relationships wherein a configuration script or source code for a software component verifies the instantiation or presence of another software component, input relationships wherein a software component reads in as input a file or data stream from another software component, output relationships wherein a software component addresses its output to another software component or file accessed by another software component. Other types of relationships may also be identified 406. As known in the art, a single software component may have multiple relationships of multiple types with other software components.

Identifying 406 software components may include identifying specific instances of software components. For example, where a first component instantiates a second type of component, each occurrence of instantiation of the first component will result in instantiation of the second type of component. Accordingly, each instance of all software components generated according to each invocation of the instantiating instructions for a software component may be identified 406 as software components in the topology of the installation 104.

The method 400 may further include evaluating 410 status data for each identified 406 instance of a software component. The topology may be plotted 412 according to the identified 406 software components and the identified 408 relationships between software components. A graphical representation of the status of one or both of the software components and the connections between software components may also be plotted 414 in association (such as an overlay or adjacent indicator) with the graphical representation of the software components or connections in the topology.

In some embodiments, a topology may be too large and complex to represent in a single plot. Accordingly, in some embodiments, only top level components in a hierarchy of components may be represented. A representation of the lower levels may be generated upon selection of a user of a representation of a top level component, such as by clicking or otherwise selecting or interaction with the selected component.

Figure 5:
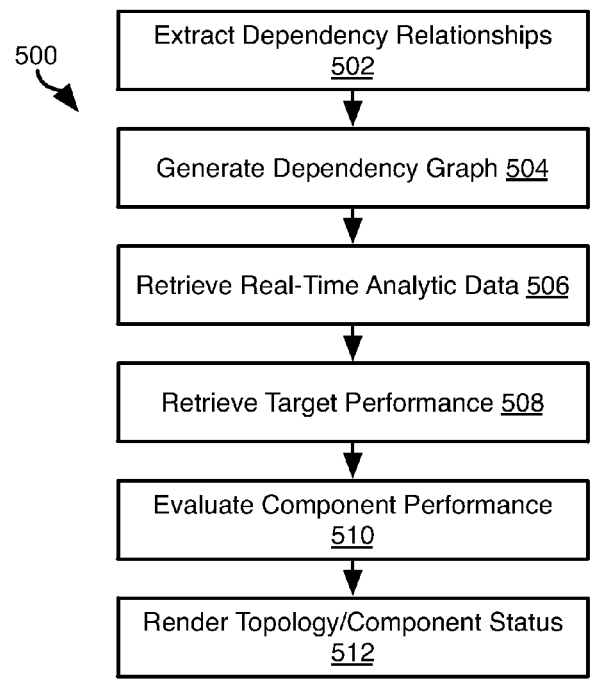
FIG. 5 is a process flow diagram of a method for providing a topology graph with status indicators in accordance with an embodiment of the present invention.

FIG. 5 illustrates an example method 500 for generating a topology graph with status indicators associated with graphical representations of software components of an installation 104. The method 500 may include extracting 502 dependency relationships for the installation 104. This may include identifying software components and relationships there between as described above with respect to the method 400. For purposes of the method 500 only those relationship that indicate a dependency during operation may be extracted 502. For example, where a first component receives as one of its inputs an output of a second component, the first component may be considered to be dependent on the second component. Other dependency relationships may also be identified and extracted 502.

Figure 6:
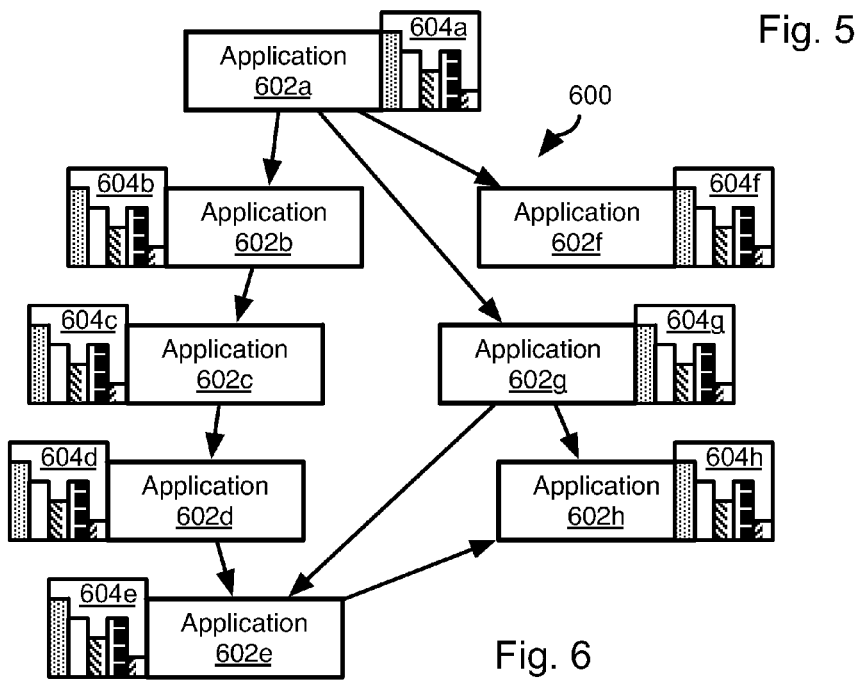
FIG. 6 is a topology graph with status indicators in accordance with an embodiment of the present invention.

A dependency graph may be generated 504 that illustrates the software components and the dependency relationships there between. For example, as shown in FIG. 6, the applications 602a-602h illustrate examples of graphical representations of software components with arrows indicating dependency relationships there between. The graphical representations may have shapes indicating a type of component and may further include a label indicating one or both of a type of the component and a unique identifier for the component.

The method 500 may further include retrieving 506 real time analytic data for the software components. As noted above, the real time analytic data may be received directly from the software components or be received from an aggregator of such data or a monitoring service. As also noted above, where status data is aggregated, data may be extracted and correlated to a corresponding software component.

In some embodiments, a target performance corresponding to one or more items of status data may be specified or determined from historical values of the one or more items of status data. Accordingly, for each of one or more of the components of the installation 104, this target performance may be retrieved 508 and the current status data may be compared to the target performance data in order to evaluate 510 the performance of the component. In some embodiments, where the actual status is outside of an acceptable range as indicated by the status performance, an alert may be generated and transmitted for display or output to an administrator. In some embodiments, components having a status outside an acceptable range may be highlighted to indicate this fact, e.g. shown in red or flashing.

A graphical representation of the topology and the performance evaluated 510 for the components of the topology may then be rendered 512. The graphical representation may be an actually displayed representation or a data file that is renderable into a displayed image using a viewing application such as a browser, NOC dashboard, PDF viewer, sharepoint document, or the like. For example, as shown in FIG. 6, a rendering 600 may include indicators 604a-604h indicating the performance of software components adjacent the graphical representations 602a-602h of the corresponding software components. The indicators 604a-604h may be any symbol, graph (bar, pie, scatter, etc), text, or the like that is indicative of one or both of the current status of the corresponding software component and the performance of the software component with respect to a target value.

In some embodiments, the illustrated topology 106 may be integrated with tools to change the operation of the installation 104. For example, where a component is found to be performing outside an acceptable range, an "action" interface element may be presented that causes the installation 104 to bypass the apparently defective component as known in the art of NOC interface technology.

Figure 7:
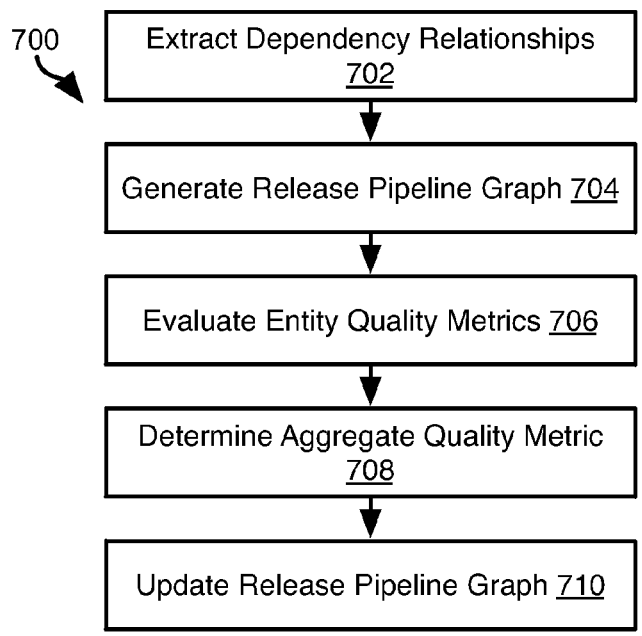
FIG. 7 is a process flow diagram of a method for generating a release pipeline graph in accordance with an embodiment of the present invention.

FIG. 7 illustrates a method 700 for generating a release pipeline graph for an installation 104. The method 700 may include extracting 702 dependency relationships in the same manner as in any of the methods described above. A release pipeline graph may be generated 704. The release pipeline graph may be a generic release pipeline graph that indicates stages of development and quality control that are typical to all software released by an entity or industry. The quality metrics for the software components of the installation 104 may be evaluated 706 with respect to identified dependencies. The quality metrics for the software components may be ingested and aggregated 708 to determine a minimum stage of development for the installation 104. For example, the dependencies may be traversed starting at a root component in order to evaluate each component. The component having the least advanced stage of development may then have its status used to update 710 the release pipeline graph. In some embodiments, a user may drill down into a release pipeline graph to determine the status of a branch of the topology of the installation 104. The release status of a branch of a topology of the installation 104 may be determined in the same manner as the entire installation 104 with the exception that only the selected node and branches that are rooted at a selected node are traversed.

Figure 8:
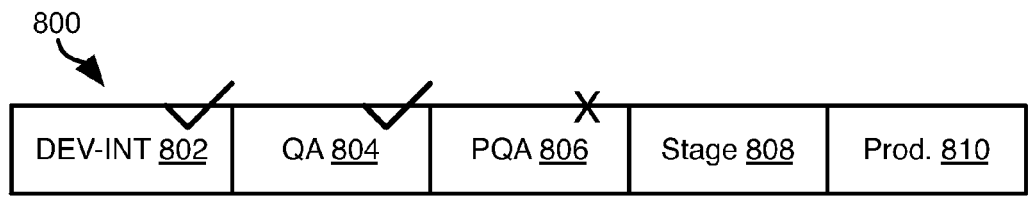
FIG. 8 is a release pipeline graph generated in accordance with an embodiment of the present invention.

FIG. 8 illustrates an example of a release pipeline graph 800 that may be generated for an installation. The graph 800 may include indicators for various stages of the development process including development 802, quality assurance (QA), performance quality assurance (PQA) 806, staging 808, and production 810. At the PQA stage, the performance of an installation 104, or a software component of an installation, may be compared to a target service level. In some embodiments, this may include one or both of evaluating a response time of each software component in a workflow path with respect to a threshold and evaluating a complete response time of the workflow path with respect to a threshold. One or more indicators, such as the illustrated check marks and x may be used to indicate whether an installation 104 has passed given stage of development as determined according to the method 700.

Figure 9:
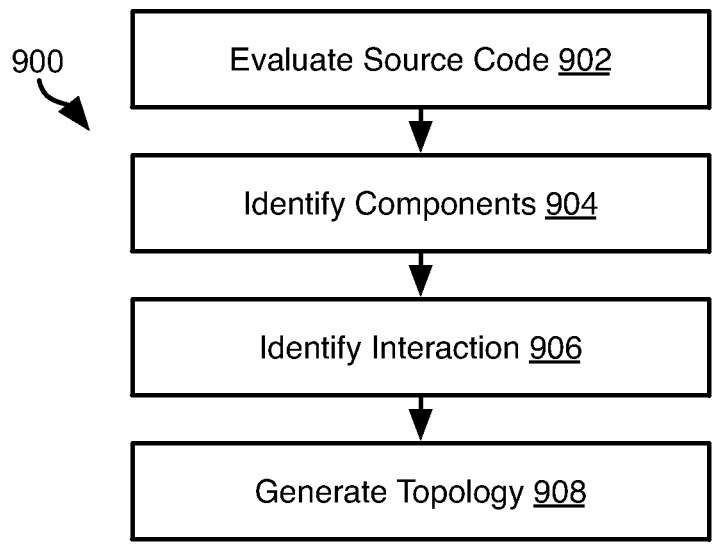
FIG. 9 is a process flow diagram of a method for generating a diagram of a service architecture in accordance with an embodiment of the present invention.

FIG. 9 illustrates an example method 900 that may be used to generate a service architecture diagram in accordance with the methods described herein. In many applications, an entity may divide a workflow into a plurality of services that communicate with one another to provide a task. As an example, an online commerce site may have a service to provide a web interface to user for accessing a product catalog, a service to process customer checkout, a service to manage user accounts, a service to process electronic payments, and the like. The illustrated method 900 may be used to visualize a complex service architecture.

The method 900 may include evaluating 902 source code for the software components of the architecture and, according to the evaluation, identifying 904 software components and identifying 906 interactions among components. Identifying 904 components and identifying 906 interactions may be performed in the same manner as the embodiments described above. In particular, for the method 900 only input or output relationships may be identified and other relationships mentioned above may be ignored (e.g. instantiation relationships) if they do not indicate actual interaction in the course of processing production data. In some embodiments, identifying 906 interactions may include identifying one or more of input arguments passed between software components and output values.

Figure 10:
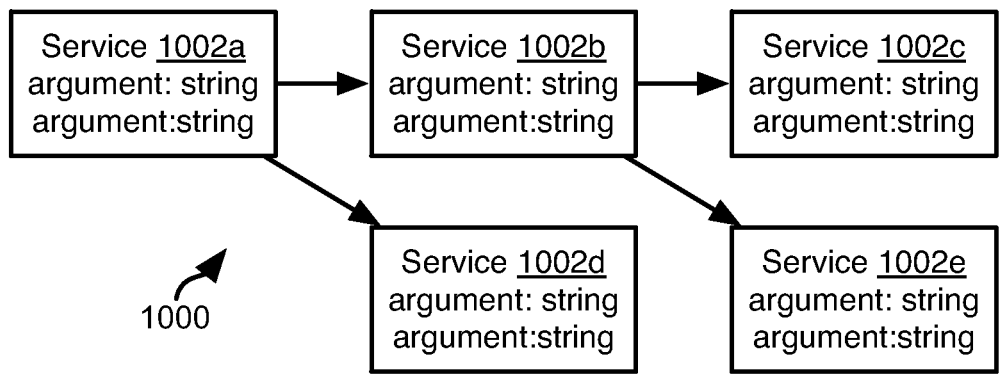
FIG. 10 is a service architecture diagram generated in accordance with an embodiment of the present invention.

The method 900 may then generate 908 a topology reflecting both the identified 904 components and the relationships there between. For example, FIG. 10 illustrates an example service architecture 1000. Each identified service may be graphically represented with a graphical element 1002a-2002e with the arrows indicating an output to input relationship. In some embodiments, text or other graphical data indicating the input arguments for the service may also be associated with the graphical element 1002a, 1002b for a service.

Figure 11:
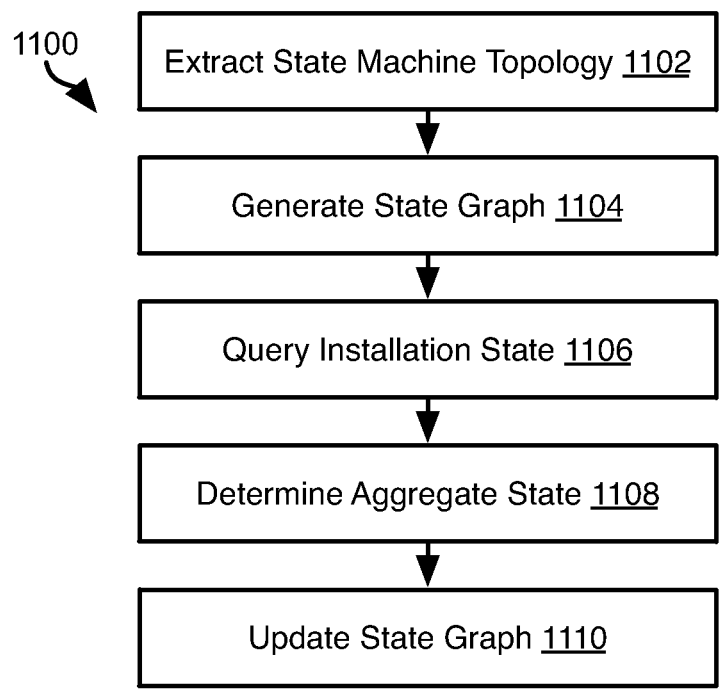
FIG. 11 is a process flow diagram of a method for generating a state machine diagram in accordance with an embodiment of the present invention.

FIG. 11 illustrates a method 1100 for generating a state machine diagram. In some embodiments, the processing of an installation 104 may be representable as a state machine. In particular, the installation 104 may receive a task and the task may be in various stages of processing until the task is complete. Although some applications have dedicated logic for displaying a state machine-type status, the illustrated method 1100 generates a state machine diagram with an updated status without explicit instructions from the application specifying the state of the application.

Figure 12:
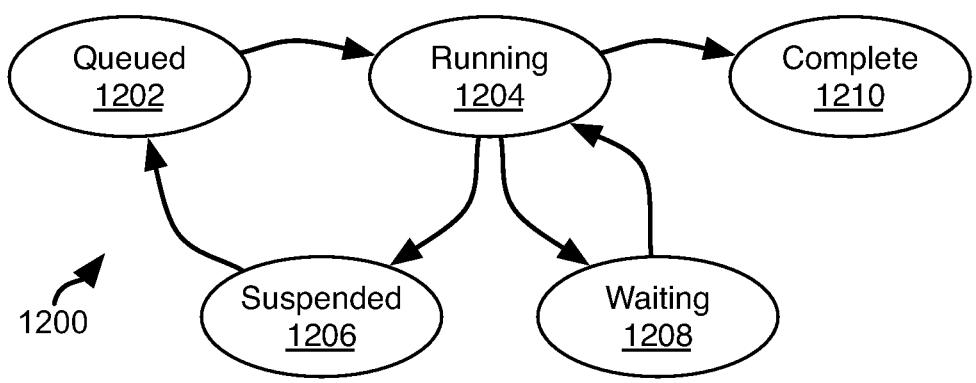
FIG. 12 is a state machine diagram generated in accordance with an embodiment of the present invention.

Referring to FIG. 12, examples of states of a task in a state machine diagram 1200 may include queued 1202, running 1204, suspended 1206, waiting 1208, and complete 1210. In some embodiments, whichever of these status indicators corresponds to the current state of a workflow of the installation 104 may be highlighted or otherwise visually distinguished from the other status indicators in a visually displayed representation of the state machine diagram 1200.

Referring again to FIG. 11, the method 1100 may include extracting 1102 a topology of a state machine. This may include any of the methods described above for identifying software components and the relationships among software components. A state graph may then be generated 1104 that includes standard state machine states, such as those illustrated in FIG. 12. The state of the installation may be queried 1106. As noted above, the method 1100 provides a novel approach for determining a state machine type status for an arbitrary installation topology without explicit specification of states by the installation 104 itself. Accordingly, a result of the query 1106 may be a status of the components of the installation 104 that does not directly match to the state machine states 1200-1210. The method 1100 may include determining 1108 an aggregate state of the installation 104. For example, where a task has been received by the installation but the status data for the components does not indicate that processing of the task has commenced, the aggregate status may be queued 1202. Where at least one component of the installation is processing the task or a portion of the task, then the aggregate status may be running 1204. Where the status data for the components indicates that processing has begun but no component is currently performing processing corresponding to the task, the aggregate status may be suspended 1206 if the cause of the lack of processing is an explicit instruction or programmatic pause. If the status data of the components indicates that no components are processing the task and that at least one component is waiting for some external process or interface, then the aggregate status may be waiting 1208. And, where task is completed with respect to portions of the tasks performed by all components, the aggregate status may be complete 1210.

The state machine diagram may be updated 1110 to indicate the aggregate status of the installation 104. This may include marking or otherwise visually distinguishing the current state 1202-1210 on the state diagram 1200 corresponding to the current state of the installation 104.

The foregoing types of visual representations are only examples of types of visual representations of the structure and status of an installation 104. Any other type of representation of a topology or status of a topology may be used to represent the topology and status data generated according to the methods described herein. The uses for the topological and status data obtained using the methods described herein may include any use known in the art for topological data.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:
1. A method for monitoring a system comprising:
providing a computer system including a plurality of independent software components installed on one or more computing devices, the plurality of independent software components installed according to an installation specification, the installation specification including at least one of one or more component installation speci- fications and an application manifest instructing installation of all of the plurality of independent software components;
evaluating, automatically by the computer system, the installation specification to identify the plurality of independent software components and their relationships among others of the plurality of independent software components;
subscribing, automatically by the computer system, to one or more output streams, each of the one or more output streams corresponding to a respective independent software component of the-plurality of independent software components;
extracting, automatically by the computer system, real-time status data for one or more of the plurality of independent software components, from the one or more output streams;
evaluating, automatically by the computer system, the real-time status data for each independent software component of the plurality of independent software components;
identifying, automatically by the computer system, a plurality of tasks for which processing has commenced by the plurality of independent software components having an identified relationship;
identifying, automatically by the computer system, a status for each task of the plurality of tasks, the status for each task including whether the each task is at least one of running, suspended, waiting, and complete, wherein the status is derived from the real-time status data;
determining, automatically by the computer system, that the statuses of the plurality of tasks do not include running or waiting and that a lack of processing is due to one of an explicit instruction and a programmatic pause;
in response to determining that the statuses of the plurality of tasks do not include running or waiting and that the lack of processing is due to one of the explicit instruction and the programmatic pause, displaying, automatically by the computer system, as a status of the installation an aggregate status of suspended;
determining, automatically by the computer system, at least one status of the statuses of the plurality of tasks is running;
in response to determining that at least one status of the statuses of the plurality of tasks is running, displaying, automatically by the computer system, as a status of the installation an aggregate status of running;
determining, automatically by the computer system, that the at least one status of the statuses of the plurality of tasks is waiting and that none of the statuses is running; and
in response to determining that at least one status of the statuses of the plurality of tasks is waiting and that none of the statuses is running, displaying, automatically by the computer system, as a status of the installation an aggregate status of waiting.

2. The method of claim 1, wherein the identified relationships include instantiation relationships.

3. The method of claim 1, wherein the identified relationships include input and output relationships.

4. The method of claim 1, wherein the real-time status data includes quality assurance status data; and
wherein the method further comprises generating, by the computer system, a graphical representation of the real-time status data correlated to the plurality of independent software components and identified relationships among the plurality of independent software components further comprises:
aggregating quality assurance status data for the plurality of independent software components; and displaying the aggregated quality assurance status data on a release pipeline graph.

5. The method of claim 1, wherein the plurality of independent software components implement a workflow engine having a representable workflow state;
wherein the real-time status data indicates the representable workflow state; and
wherein the method further comprises generating, by the computer system, a graphical representation of the real-time status data correlated to the plurality of independent software components and identified relationships among the plurality of independent software components further comprises:
graphically representing the representable workflow state on a state machine diagram.

6. The method of claim 1, wherein the plurality of independent software components each implement a service for access by a website;
wherein evaluating, by the computer system, the installation specification to identify the plurality of independent software components and identify relationships among the plurality of independent software components further comprises:
evaluating source code for the plurality of independent software components to identify interaction relationships among the plurality of independent software components and input arguments for the plurality of independent software components; and
wherein the method further comprises generating, by the computer system, a graphical representation of the real-time status data correlated to the plurality of independent software components and identified relationships among the plurality of independent software components further comprises:
generating a topology graph representing the plurality of independent software components and interaction among the plurality of independent software components, including a representation of input arguments for the plurality of independent software components.

7. The method of claim 1, wherein the plurality of independent software components implement a platform as a service (PaaS).

8. The method of claim 1, wherein:
the installation specification is an application manifest;
the application manifest defines provisioning of at least a first portion of the independent software components for use by a second portion of the independent software components; and
evaluating, by the computer system, the installation specification to identify the plurality of independent software components and identify relationships among the plurality of independent software components further comprises identifying provisioning relationships between the first portion of the independent software components and the second portion of the independent software components as specified in the application manifest.

9. The method of claim 1, wherein:
the installation specification is an application manifest;
the application manifest is a top node of a manifest tree wherein each node of the manifest tree is a component to be provisioned by the application manifest or a component manifest and descendants of each node are components provisioned for the node according to a component manifest; and
evaluating, by the computer system, the installation specification to identify the plurality of independent software components and identify relationships among the plurality of independent software components further comprises extracting a description of the manifest tree from the application manifest and any component manifests.

10. A computer system comprising:
one or more computing devices each comprising one or more processors and one or more memory devices storing executable and operational code, the executable and operational code including:
a plurality of independent software components installed on one or more computing devices, the plurality of independent software components installed according to an installation specification, the installation specification including at least one of one or more component installation specifications and an application manifest instructing installation of all of the plurality of independent software components; and
a topology service is further effective to cause the one or more processors of at least one of the one or more computing devices to:
evaluate, automatically, the installation specification to identify the plurality of independent software components and their relationships among others of the plurality of independent software components;
identify, automatically, a plurality of tasks for which processing has commenced by the plurality of independent software components having an identified relationship;
subscribe, automatically, to one or more output streams, each of the one or more output streams corresponding to a respective independent software component of the plurality of independent software components;
extract, automatically, a real-time status data for one or more of the plurality of independent software components, from the one or more output streams;
evaluate, automatically, the real-time status data for each independent software component of the plurality of independent software components;
identify, automatically, a status for each task of the plurality of tasks, the status for each task including whether the each task is at least one of running, suspended, waiting, and complete, wherein the status is derived from the real-time status data;
if statuses of the plurality of tasks do not include running or waiting and a lack of processing is due to one of an explicit instruction and a programmatic pause, display, automatically, as a status of the installation an aggregate status of suspended;
if at least one status of the statuses of the plurality of tasks is running, display, automatically, as a status of the installation an aggregate status of running; and
if at least one status of the statuses of the plurality of tasks is waiting and none of the statuses is running, display, automatically, as a status of the installation an aggregate status of waiting.

11. The computer system of claim 10, wherein the identified relationships include instantiation relationships.

12. The computer system of claim 10, wherein the identified relationships include input and output relationships.

13. The computer system of claim 10, wherein the real-time status data includes quality assurance status data; and
wherein the topology service is further effective to cause the one or more processors of at least one of the one or more computing devices to:
generate a graphically representable description of the real-time status data correlated to the plurality of independent software components and identified relationships among the plurality of independent software components by:
aggregating quality assurance status data for the plurality of independent software components; and
displaying the aggregated quality assurance status data on a release pipeline graph.

14. The computer system of claim 10, wherein the plurality of independent software components implement a workflow engine having a representable workflow state;
wherein the real-time status data indicates the representable workflow state; and
wherein the topology service is further effective to cause the one or more processors of at least one of the one or more computing devices to:
generate a graphically representable description of the real-time status data correlated to the plurality of independent software components and identified relationships among the plurality of independent software components by graphically representing the representable workflow state on a state machine diagram.

15. The computer system of claim 10, wherein the plurality of independent software components each implement a service for access by a website; and
wherein the topology service is further effective to cause the one or more processors of at least one of the one or more computing devices to:
evaluate the installation specification to identify the plurality of independent software components and identify relationships among the plurality of independent software components by evaluating source code for the plurality of independent software components to identify interaction relationships among the plurality of independent software components and input arguments for the plurality of independent software components; and
generate a graphically representable description of real-time the status data correlated to the plurality of independent software components and identified relationships among the plurality of independent software components by generating a topology graph representing the plurality of independent software components and interaction among the plurality of independent software components, including a representation of input arguments for the plurality of independent software components.

16. The computer system of claim 10, wherein the plurality of independent software components implement a platform as a service (PaaS).

17. The computer system of claim 10, wherein:
the installation specification is an application manifest;
the application manifest defines provisioning of at least a first portion of the independent software components for use by a second portion of the independent software components; and
the topology service is further effective to cause the one or more processors of at least one of the one or more computing devices to evaluate the installation specification to identify the plurality of independent software components and identify relationships among the plurality of independent software components by identifying provisioning relationships between the first portion of the independent software components and the second portion of the independent software components as specified in the application manifest.

18. The computer system of claim 10, wherein:
the installation specification is an application manifest;
the application manifest is a top node of a manifest tree wherein each node of the manifest tree is a component to be provisioned by the application manifest or a component manifest and descendants of each node are components provisioned for the node according to a component manifest; and the topology service is further effective to cause the one or more processors of at least one of the one or more computing devices to evaluate the installation specification to identify the plurality of independent software components and identify relationships among the plurality of independent software components by extracting a description of the manifest tree from the application manifest and any component manifests.

19. The computer system of claim 10, wherein:

the topology service is further effective to cause the one or more processors of at least one of the one or more computing devices to:

retrieve an aggregated status data for one or more of the plurality of independent software components from an aggregator of the real-time status data; and correlate the aggregated status data to a particular component of the plurality of independent software components.

\* \* \* \* \*